US005729313A

United States Patent [19]
Mitsui

[11] Patent Number: 5,729,313
[45] Date of Patent: Mar. 17, 1998

[54] REFLECTION-TYPE LIQUID CRYSTAL DISPLAY DEVICE HAVING HOLOGRAPHIC COLOR REFLECTIVE FILM BONDED TO LIGHT ABSORBING LAYER

[75] Inventor: Seiichi Mitsui, Kashiwa, Japan

[73] Assignee: Sharp Kabushiki Kaisha, Osaka, Japan

[21] Appl. No.: 649,309

[22] Filed: May 17, 1996

[30] Foreign Application Priority Data

May 19, 1995 [JP] Japan .................... 7-121926

[51] Int. Cl.$^6$ ........................... G02F 1/1335
[52] U.S. Cl. ............. 349/106; 349/110; 349/114; 349/104; 359/15
[58] Field of Search ............ 359/15, 22; 349/104, 349/105, 106, 114, 110, 165, 113

[56] References Cited

U.S. PATENT DOCUMENTS 3,569,614  3/1971  Hanlon ...................... 349/106
5,442,467  8/1995  Silverstein et al. ............ 349/106
5,526,145  6/1996  Weber ........................ 349/106
5,537,232  7/1996  Biles ......................... 349/106

FOREIGN PATENT DOCUMENTS 60-147720  10/1985  Japan .
6-75238    3/1994   Japan .

Primary Examiner—William L. Sikes
Assistant Examiner—Tai V. Duong
Attorney, Agent, or Firm—David G. Conlin; David D. Lowry

[57] ABSTRACT

A reflection-type liquid crystal display device includes a first substrate formed of a material which allows transmission of visible light therethrough; a second substrate opposed to the first substrate; a liquid crystal layer interposed between the first substrate and the second substrate; a light absorbing layer provided on the second substrate for absorbing the visible light; and a holographic color reflective film provided on the light absorbing layer and having a light reflecting area for reflecting light of a prescribed wavelength range of the visible light.

4 Claims, 3 Drawing Sheets

REFLECTION-TYPE LIQUID CRYSTAL DISPLAY DEVICE HAVING HOLOGRAPHIC COLOR REFLECTIVE FILM BONDED TO LIGHT ABSORBING LAYER

BACKGROUND OF THE INVENTION

1. Field of the Invention

The present invention relates to a reflection-type liquid crystal display device, and in particular, a reflection-type liquid crystal display device preferably used in an office automation apparatus such as a wordprocessor or a notebook-type personal computer, a video apparatus, a game apparatus, or the like.

2. Description of the Related Art

Recently, liquid crystal display devices (hereinafter, referred to as "LCD devices") have been more and more widely applied to wordprocessors, laptop-type personal computers, pocket-size TVs, and the like. A reflection-type LCD device, which displays images by reflecting light incident from outside, does not need backlight. Thus, this type of LCD device realizes low power consumption and a thin and lightweight structure.

Conventionally, reflection-type LCD devices are available in a TN (twisted nematic) system in which liquid crystal molecules are driven in a TN mode and an STN (super twisted nematic) system in which liquid crystal molecules are driven in an STN mode.

In the TN mode, an LCD cell is interposed between two polarizing plates, and images are displayed by utilizing optical switching characteristics of the liquid crystal molecules. More specifically, monochrome images are displayed by utilizing the optical rotatory characteristic which is shown when no voltage is applied to the cell and the non-polarizing characteristic (non-optical-rotatory-characteristic) which is shown when a voltage is applied to the cell.

For displaying color images, red, green and blue filters are provided in the LCD device. Multiple-color images or full-color images are displayed using an additive color mixing process and the above-described optical switching characteristic.

The TN mode is used in, for example, portable pocket-size TVs either of an active-matrix or simple-matrix driving system.

The STN mode, which is widely used for wordprocessors, is similar to the TN mode, but the twisting angle of the liquid crystal molecules are set to be 180 to 270 degrees. In the STN mode, the twisting angle is increased by 90 degrees compared with the twisting angle in the TN mode, and the angle of the polarizing plates is optimized. When a voltage is applied to the LCD device, a drastic orientation deformation of the liquid crystal molecules causes a change in birefringence of the liquid crystal layer. Thus, the opto-electric characteristic of the STN LCD device significantly changes at the threshold level. Accordingly, the STN mode is suitable for simple-matrix driving.

The STN mode has a problem in that the background of the image is colored yellowish green or dark blue by the birefringence of the liquid crystal layer. In order to alleviate such a problem and thus realize better black-and-white display, color compensation is performed by overlaying an optical compensation panel or a phase plate formed of a polymer such as polycarbonate on the liquid crystal panel. LCD devices including such a phase plate are marketed today as paper-white LCD devices. The operation principle of the TN mode and the STN mode is described in detail in "Handbook of Liquid Crystal Device", the 142nd Committee of Japan Society for the Promotion of Science, 1989, pp. 329 to 346, published by Nikkan Kogyo Shimbunsha.

FIG. 4 is a cross sectional view of such a conventional reflection-type LCD panel 200 in the TN or the STN mode for displaying monochrome images.

As is shown in FIG. 4, the LCD panel 200 includes two glass substrates 2a and 2b. A common electrode 3a is provided on a surface of the glass substrate 2a opposed to the glass substrate 2b, and an alignment film 4a is provided on the common electrode 3a. A plurality of TFTs 1 and a plurality of transparent electrodes 3b are provided on a surface of the glass substrate 2b opposed to the glass substrate 2a, and an alignment film 4b is provided on the glass substrate 2b so as to cover the TFTs 1 and the transparent electrodes 3b.

The glass substrates 2a and 2b have a gap therebetween kept by spacers (not shown). In the gap, liquid crystal molecules are sealed to form a liquid crystal layer 5. Polarizing plates 6 and 7 are respectively provided on outer surfaces of the glass substrates 2a and 2b. A reflective plate 9 is provided with a space from the polarizing plate 7. The observer watches the LCD panel 200 from the side of the polarizing plate 6 opposite to the polarizing plate 7.

The reflective plate 9 is generally formed by processing a surface of a metal plate of, for example, aluminum by sandblasting or the like to provide appropriate light scattering (diffuse reflection) characteristics, or by forming corrugation on a surface of a reflective plate and then depositing metal such as aluminum thereon to provide appropriate light scattering characteristics.

For color display, the inventors of the present invention disclose in Japanese Laid-Open Patent Publication No. 6-75238 an LCD device including a reflective film which is formed by providing corrugation to a surface of a substrate opposed to the liquid crystal layer using an organic resin and then depositing an aluminum layer thereon.

The reflective plate formed by sandblasting or the like has an excessively low reflectance to provide a sufficiently bright display. Further, such a reflective plate can only be located outside the substrate, resulting in a parallax due to the thickness of the glass substrate (the glass substrate 2b in FIG. 4).

The reflection-type LCD device disclosed in Japanese Laid-Open Patent Publication No. 6-75238 includes color filters. Coloring agents used for the color filters have excessively low light transmittance to realize a clear color display. Further, although the problem of a parallax is solved, the microscopic corrugation formed on the surface of the reflective film, which is provided on the inner surface of the substrate in order to scatter the incident light, disturbs the orientation of the liquid crystal molecules.

SUMMARY OF THE INVENTION

The reflection-type liquid crystal display device according to the present invention includes a first substrate formed of a material which allows transmission of visible light therethrough; a second substrate opposed to the first substrate; a liquid crystal layer interposed between the first substrate and the second substrate; a light absorbing layer provided on the second substrate for absorbing the visible light; and a holographic color reflective film provided on the light absorbing layer and having a light reflecting area for reflecting light of a prescribed wavelength range of the visible light.

According to the present invention, a holographic color reflective film acting as both a reflective film and color filters is provided. The holographic color reflective film has light reflecting areas, each for reflecting light of a prescribed wavelength range. By provision of such a film, separate color filters can be eliminated, and thus light absorption caused by the color filters in the conventional device is eliminated.

The efficiency of the conventional color filters and the reflective plate or film combined is about 70% for each of the RGB colors. In contrast, the efficiency of the holographic color reflective film according to the present invention is 90% or more for each of the RGB colors.

Since the holographic color reflective film has directivity, the images obtained are sufficiently bright.

The holographic color reflective film, which acts both as a reflective film and color filters, simplifies the structure of the LCD device.

The holographic color reflective film is formed by optical processing by utilizing an interference phenomenon. In detail, a photosensitive material is located in an interference optical system. Each of a plurality of areas of the photosensitive film, which will correspond to each of the picture elements for each of the RGB colors when the LCD device is completed, is exposed to a laser beam having a prescribed wavelength incident at a prescribed angle. The prescribed wavelength and angle determine the interference pattern formed in the photosensitive film. The holographic color reflective films formed in this manner can be mass-produced with the same level of performance to improve the production yield.

The holographic color reflective film is provided on a surface of one of the substrates, the surface being opposed to the liquid crystal layer. Accordingly, the problem of a parallax is solved. Moreover, since the holographic color reflective film formed utilizing interference has a flatter reflecting surface than that of the conventional reflective plate or film, the orientation of the liquid crystal molecules is not disturbed even though the holographic color reflective film is provided on the surface of the substrate opposed to the liquid crystal layer. Thus, the images obtained by an LCD including such a holographic color reflective film are of higher quality.

Thus, the invention described herein makes possible the advantage of providing a high-quality reflection-type liquid crystal display device capable of color display.

These and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the accompanying drawings.

Figure 1:
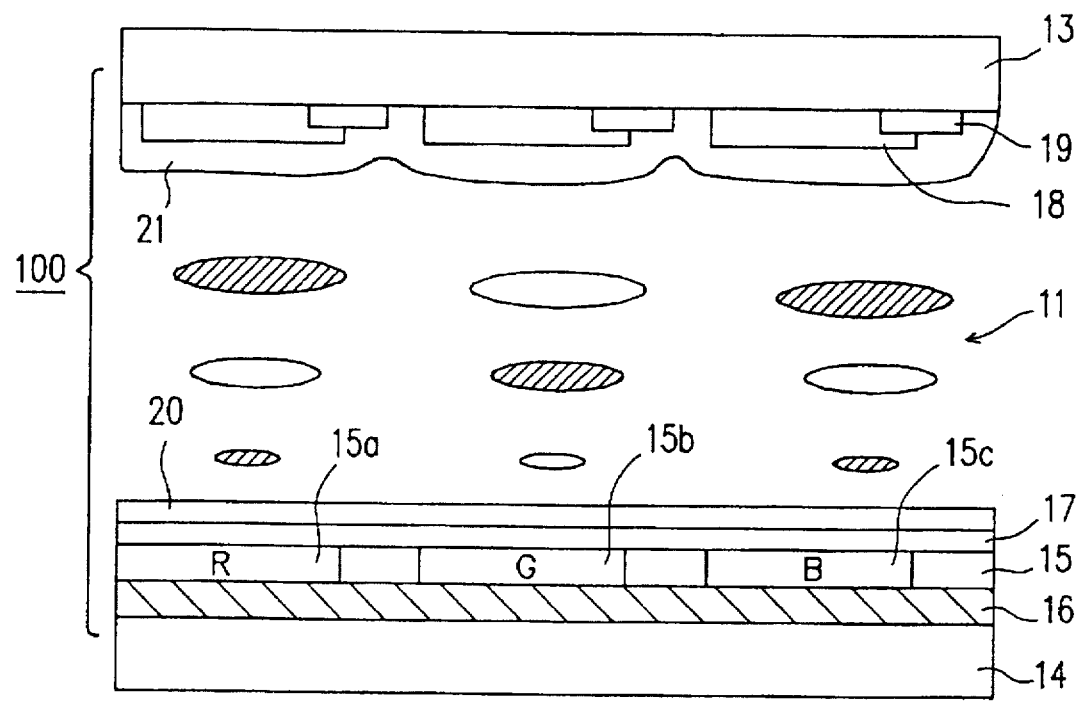
FIG. 1 is a cross sectional view of a reflection-type LCD cell in an example according to the present invention.

FIG. 1 is a cross sectional view of a reflection-type LCD cell 100 of an active-matrix driving system (one color pixel of the LCD cell 100). One pixel includes three picture elements respectively for the RGB (red, green, blue) colors.

The LCD cell 100 includes two transparent substrates 13 and 14, and a liquid crystal layer 11 containing guest-host liquid crystal molecules interposed between the two substrates 13 and 14. A light absorbing layer 16 is provided on a surface of the transparent substrate 14 opposed to the liquid crystal layer 11, and a holographic color reflective film 15 is provided on the light absorbing layer 16. A transparent electrode 17 is provided on the holographic color reflective film 15, and an alignment film formed of polyimide or the like for aligning the liquid crystal molecules is provided on the transparent electrode 17.

On a surface of the transparent substrate 13 opposed to the liquid crystal layer 11, a plurality of transparent electrodes 18 and a plurality of TFTs 19 are located in a matrix. The TFTs 19 act as switching devices. An alignment film 21 for aligning the liquid crystal molecules is provided on the transparent substrate 13 so as to cover the transparent electrodes 18 and the TFTs 19. As is described above, one pixel includes three picture elements. One picture element is defined by each transparent electrode 18 and the corresponding TFT 19. The three picture elements included in one pixel respectively correspond to the RGB colors.

The holographic color reflective film 15 has striped light reflecting areas 15a, 15b and 15c respectively in correspondence with the picture elements for the RGB colors.

Hereinafter, a method for producing the LCD cell 100 will be described.

On a transparent substrate 14 formed of barium borosilicate, sodium glass, plastics, quartz glass or the like, the light absorbing layer 16 and the holographic color reflective film 15 are formed sequentially. The light absorbing layer 16 is formed by coating the transparent substrate 14 with a resin black by a spinner and baking the resultant laminate at a temperature of 180° C. The resin black used in this example is CK2000 produced by Fuji-Hunt Technology, Co., Ltd. The light absorbing layer 16 is bonded to the holographic color reflective film 15.

Figure 2:
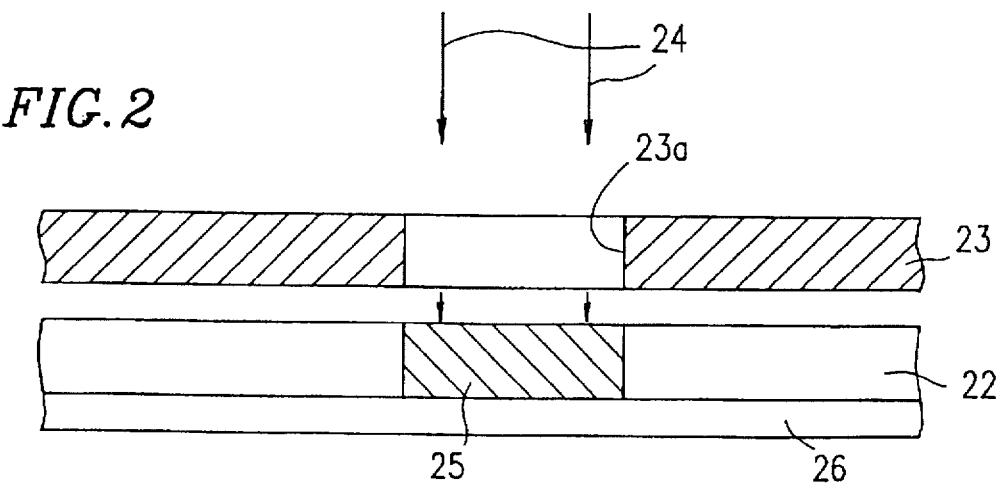
FIG. 2 is a cross sectional view illustrating a step of producing a holographic color reflective film used in the LCD cell shown in FIG. 1.

The holographic color reflective film 15 is formed using an interference optical system as is shown in FIG. 2.

A photosensitive layer 22 is provided on a mirror 26. The photosensitive layer 22 has areas which will respectively correspond to picture elements for the RGB colors when the completed holographic color reflective film 15 is incorporated in the LCD device 100. A mask 23 having stripe-like opening 23a is located to be opposed to the photosensitive layer 22. The mask 23 is positioned so that the opening 23a is aligned with, for example, an area 25 corresponding to the picture element for red. The red laser beam 24 is perpendicularly incident on the photosensitive layer 22. Then, the red laser beam 24 interferes with the laser beam reflected by the mirror 26, thereby recording interference fringes in the area 25 exposed to the red laser beam 24. The interference fringes are parallel to the surface of the photosensitive layer 22.

Next, the mask 23 is moved to the position at which the opening 23a is aligned with an area of the photosensitive layer 22 corresponding to the picture element for green (not shown in FIG. 2). A green laser beam is perpendicularly incident on the photosensitive layer 22 to record interference fringes in the area corresponding to the picture element for green. In the same manner, a blue laser beam is perpendicularly incident on the photosensitive layer 22 to record interference fringes in an area of the photosensitive layer 22 corresponding to the picture element for blue.

Detailed conditions for forming the holographic color reflective film 15 are as follows:

The photosensitive film 22 has a thickness of 10 μm and is formed of, for example, gelatin bichromate to which methylene blue is added for a higher sensitivity with respect to red light.

As the laser for recording interference fringes, the following are used:

Red laser: Krypton laser
(Innova 200K3, produced by Coherent, Ltd.)
   Optical output: 5 W
   Wavelength: 647 nm
Green laser: Argon ion laser
(220-055, produced by Spectra Physics, Ltd.)
   Optical output: 5 W
   Wavelength: 488 nm
Blue laser: Argon ion laser
(220-055, produced by Spectra Physics, Ltd.)
   Optical output: 5 W
   Wavelength: 414 nm Each area of the photosensitive layer 22 is exposed to the laser beam for 6 seconds at 60 mj/cm$^2$.

After the exposure to the laser beam, the photosensitive layer 22 is washed with water for 10 minutes, with a mixture containing IPA (isopropyl alcohol) and water at a ratio of 3:7 for 1 minute, with a mixture containing IPA and water at a ratio of 7:3 for 2 minutes, and with IPA for 5 minutes in this order. Then, the photosensitive layer 22 is dried for 15 minutes. In this manner, the holographic color reflective film 15 shown in FIG. 1 is formed.

Figure 3:
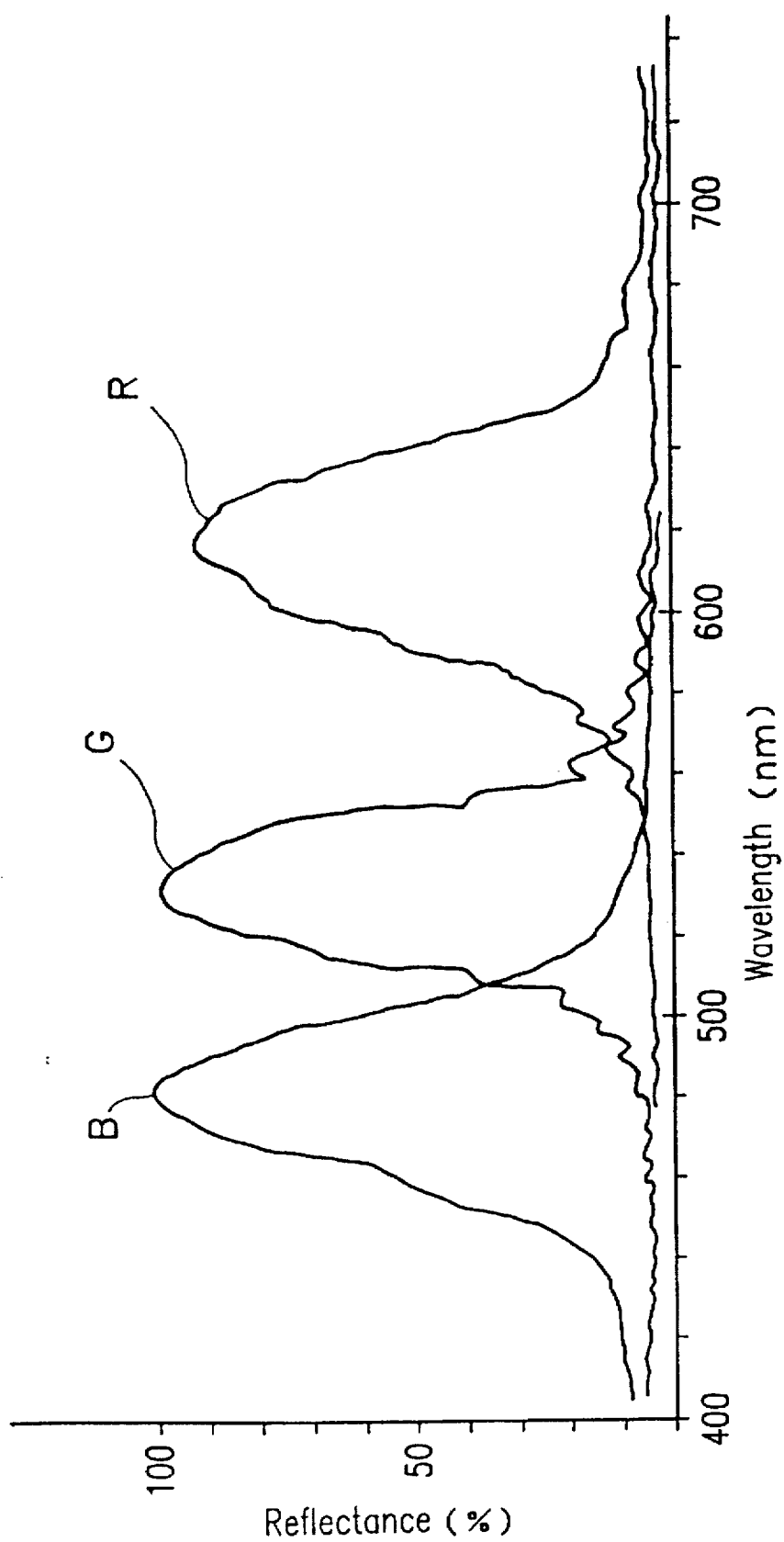
FIG. 3 is a graph illustrating the spectra of the holographic color reflective film.
Figure 4:
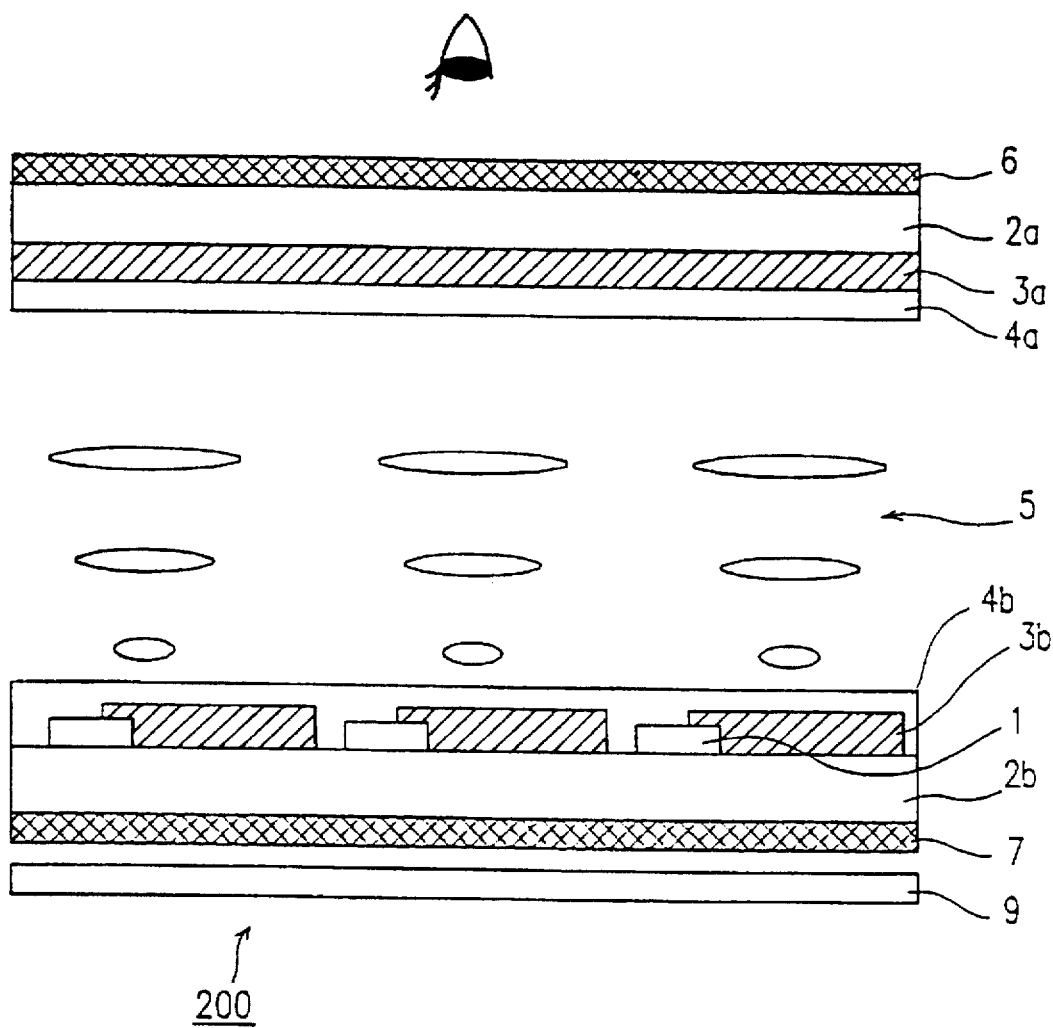
FIG. 4 is a cross sectional view of a conventional reflection-type LCD panel.

FIG. 3 is a graph illustrating the spectra of the holographic color reflective film 15. As is shown in FIG. 3, the reflectance of the film 15 with respect to each of the RGB colors is 90% to 95% or more.

After the holographic color reflective film 15 is bonded to the light absorbing layer 16, the transparent electrode 17 formed of, for example, ITO (indium tin oxide) is formed on the entire surface of the holographic color reflective film 15 in a thickness of 100 nm.

On the transparent substrate 13 formed of glass or the like, TFTs 19 and the transparent electrodes 18 are provided in a known manner.

The alignment film 20 formed of polyimide or the like is printed on the transparent electrode 17 in a thickness of 70 nm, and the alignment film 21 also formed of polyimide or the like is printed on the transparent substrate 13 in a thickness of 70 nm so as to cover the TFTs 19 and the transparent electrodes 18.

The transparent substrates 13 and 14 having the above-described elements thereon are combined together with a gap therebetween, and black guest-host liquid crystal molecules mixed with a dichroic dye are injected into the gap to form the liquid crystal layer 11. Thus, the LCD cell 100 shown in FIG. 1 is produced.

The black guest-host liquid crystal used in this example is ZLI2327 (produced by Merck & Co., Inc.) to which an optically active substance (s811, produced by Merck & Co., Inc.) is added at a ratio of 4.5%. There are various other types of black guest-host liquid crystal materials commercially available.

When a display screen of the LCD cell 100 is observed in the ambient light, an area of the screen corresponding to a picture element supplied with a voltage appears to be vividly colored with the corresponding red, green or blue. An area of the screen corresponding to a picture element supplied with no voltage appears black because the incident light is almost entirely not reflected. The measured contrast is 10, which indicates a satisfactory level of color display characteristic.

According to the present invention, an LCD device includes a holographic color reflective film which has light reflecting areas provided on one of two substrates interposing a liquid crystal layer. The light reflecting areas respectively reflect light of prescribed colors. Such a structure eliminates the necessity of color filters, and thus the problem of light absorption conventionally caused by the color filters is solved, resulting in clearer color display.

Since the holographic color reflective film acts both as color filters and a reflective film, the structure of the LCD device is simplified.

The holographic color reflective film is formed by utilizing interference. Accordingly, even a holo-graphic color reflective film for an LCD cell having a different pixel pattern can be formed to have the same level of performance by simply changing the shape of the opening of the mask. Such holographic color reflective films can be mass-produced with the same level of performance, thereby significantly improving the production yield.

The holographic color reflective film is located on a surface of the substrate opposed to the liquid crystal layer, thereby solving the problem of a parallax. Furthermore, the holographic color reflective film formed by utilizing interference has a flatter reflecting surface. Accordingly, even though the film is located on the surface of the substrate opposed to the liquid crystal layer, the orientation of the liquid crystal molecules are not disturbed. The LCD device including such a holographic color reflective film improves the quality of display.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A reflection-type liquid crystal display device, comprising:

a first substrate formed of a material which allows transmission of visible light therethrough;

a second substrate opposed to the first substrate;

a liquid crystal layer interposed between the first substrate and the second substrate;

a light absorbing layer provided on the second substrate for absorbing the visible light; and a holographic color reflective film bonded to the light absorbing layer and having a light reflecting area for reflecting light of a prescribed wavelength range of the visible light.

2. A reflection-type liquid crystal display device according to claim 1, wherein the light absorbing layer and the holographic color reflective film are provided on a surface of the second substrate, the surface being opposed to the liquid crystal layer.

3. A reflection-type liquid crystal display device according to claim 1, including a plurality of pixels each having three picture elements respectively in correspondence with the RGB colors, wherein the holographic color reflective film has three light reflecting areas respectively for reflecting light of prescribed wavelength ranges corresponding to the RGB colors.

4. A reflection-type liquid crystal display device according to claim 1, wherein the liquid crystal layer contains guest-host liquid crystal molecules.

* * * * *